United States Patent
Powell et al.

(10) Patent No.: US 12,553,205 B2
(45) Date of Patent: Feb. 17, 2026

(54) ANCHORING SYSTEM FOR A TRAFFIC BARRIER

(71) Applicant: RSG International Corp., Stouffville (CA)

(72) Inventors: Benjamin Fraser Powell, King City (CA); Dean Clinton Alberson, Ingram, TX (US); Mohammad Talha Ghuman, Newmarket (CA); Leo J. Yodock, III, Bloomsburg, PA (US)

( * ) Notice: Subject to any disclaimer, the term of this patent is extended or adjusted under 35 U.S.C. 154(b) by 610 days.

(21) Appl. No.: 17/883,413

(22) Filed: Aug. 8, 2022

(65) Prior Publication Data
US 2023/0039574 A1 Feb. 9, 2023

Related U.S. Application Data

(60) Provisional application No. 63/231,010, filed on Aug. 9, 2021.

(51) Int. Cl.
*E02D 5/80* (2006.01)
*E01F 15/04* (2006.01)
*E01F 15/08* (2006.01)

(52) U.S. Cl.
CPC ............ *E02D 5/80* (2013.01); *E01F 15/0476* (2013.01); *E01F 15/083* (2013.01)

(58) Field of Classification Search
CPC ...... E01F 15/0476; E01F 15/083; E02D 5/80; E02D 5/808; F16B 13/141; F16B 13/02; F16B 5/0225
See application file for complete search history.

(56) References Cited

U.S. PATENT DOCUMENTS 3,199,398 A * 8/1965 Weisz ................... F16B 13/124
411/80.1
3,308,724 A 3/1967 Smith
(Continued)

FOREIGN PATENT DOCUMENTS

AT            413 832       *   4/2006  .......... E01F 15/0476
DE   10 2006 003 216 A1       7/2007
(Continued)

OTHER PUBLICATIONS

European Search Report for EP Patent Application No. 22854827.7 dated Sep. 8, 2025, 9 pages.

*Primary Examiner* — Michael P Ferguson
(74) *Attorney, Agent, or Firm* — John G. Fischer, Esq.; Michael J. Schofield, Esq.; Scheef & Stone, L.L.P.

(57) ABSTRACT

A system and method for anchoring a traffic barrier to a road is disclosed. The traffic barrier has a footer and a wall extending inward and upward from the footer to a top surface. Anchor recesses intersect the footer. A footer port extends through the footer beneath the anchor recess. An insert having a head portion and probe is positioned in the anchor recess and footer port. An insert port extends through the head portion and probe in angular relation to the longitudinal centerline of the barrier. The insert port aligns a drill for drilling a subsurface hole at a predetermined angle extending beneath the traffic barrier. Epoxy is inserted into the hole and a threaded rod is inserted through the insert port to be adhered to the road by the epoxy. A threaded fastener is connected to the threaded rod above the insert.

26 Claims, 13 Drawing Sheets

(56) References Cited

U.S. PATENT DOCUMENTS

| | | | |
|---|---|---|---|
| 4,321,989 A | | 3/1982 | Meinzer |
| 4,397,589 A | * | 8/1983 | Darroussin ............... E02D 5/76 405/262 |
| 4,494,892 A | | 1/1985 | Wojciechowski |
| 4,586,846 A | | 5/1986 | Kellison |
| 4,954,009 A | | 9/1990 | Kellison |
| 5,033,905 A | | 7/1991 | Schmidt et al. |
| 5,302,047 A | | 4/1994 | Ivey |
| 5,311,629 A | | 5/1994 | Smith |
| 5,354,144 A | | 10/1994 | Lizakowski |
| 5,471,811 A | | 12/1995 | House et al. |
| 5,493,833 A | | 2/1996 | Irimies |
| 5,651,635 A | | 7/1997 | Nagle |
| 5,666,774 A | | 9/1997 | Commins |
| 5,826,290 A | | 10/1998 | Kokonis |
| 5,882,140 A | | 3/1999 | Yodock, Jr. et al. |
| 5,906,466 A | * | 5/1999 | Eandi ................... E04F 13/0837 411/537 |
| 6,176,638 B1 | | 1/2001 | Kellison et al. |
| 6,367,205 B2 | | 4/2002 | Cornett, Sr. |
| 6,840,706 B1 | | 1/2005 | Camomilla et al. |
| 7,198,426 B2 | | 4/2007 | Kang |
| 7,226,237 B2 | | 6/2007 | Ceccarelli |
| 7,950,871 B2 | | 5/2011 | Lass et al. |
| 8,850,765 B2 | | 10/2014 | Amengual Pericas |
| 9,422,681 B2 | | 8/2016 | Smith |
| 9,890,511 B1 | * | 2/2018 | Adams ................... E02D 5/808 |
| 10,335,707 B2 | | 7/2019 | Nunes et al. |
| 2003/0068199 A1 | | 4/2003 | Ulislam et al. |
| 2019/0301509 A1 | * | 10/2019 | Philip ................... F16B 13/141 |

FOREIGN PATENT DOCUMENTS

| | | |
|---|---|---|
| JP | H07-8425 U | 2/1995 |
| WO | 2020-115710 A1 | 6/2020 |

* cited by examiner

SEC. A-A

ANCHORING SYSTEM FOR A TRAFFIC BARRIER

RELATED APPLICATION

This application claims priority to U.S. Provisional Application 63/231,010 filed Aug. 9, 2021.

FIELD OF THE DISCLOSURE

This disclosure relates to a road anchoring system for use with traffic barriers and having a particular application for use with temporary construction barriers. Temporary construction barriers include both precast concrete and steel barriers. The traffic barrier is for controlling vehicles improperly diverging from a traffic lane or roadway lane. The anchoring system minimizes displacement of the barriers upon impact. The invention relates more specifically to a new method and apparatus for anchoring such barriers to the road surface.

BACKGROUND

The goal of the temporary construction barrier anchoring system is to prevent the barrier from falling off into the excavation and to protect the workers behind the barrier. Current traffic barriers may be anchor pinned to the surface by drilling vertical holes through precast ports in the barriers, beyond the asphalt or concrete road surface and into the sub grade in most applications. Conventional practice requires the drilling to be deep to be effective, so it is common to drill holes as deep as three feet into the ground. After drilling the long hole, a hydraulic hammer tool is required to drive a steel pin all the way in to secure the barrier to the ground. The anchor pins are installed on the traffic side of the barrier.

A primary disadvantage of the prior art deep hole pinning is that it is difficult to first drill a long pilot hole with a rock drill and then hammer the pins to that depth with an impact hammer. The three-foot depth requirement of conventional deep hole pinning normally requires rental of expensive excavator mounted impact hammers to accomplish insertion of the pin.

Another disadvantage of the prior art design is that deep hole pinning creates a path for water to get below the road surface. This can be particularly troublesome in northern climates where freezing temperatures cause expansion of subsurface water and frost heaving that can force the pins upward and can damage the road surface.

Another disadvantage of the prior art design is that deep hole pinning threatens subsurface utilities and requires surveys to show where the pinning is allowable or prohibited.

Another disadvantage of the prior art design is that conventional deep hole pinning fails to provide the best protection available to displacement of the barriers on impact, and thus safety for workers operating on the opposite side of the barriers.

Another disadvantage of the prior art design is that it is extremely difficult to remove the pins when it is time to remove and relocate the barriers.

Another disadvantage of the prior art design is that it relies upon the friction between the pin and the soil medium it engages for its resistance to removal. Variations in soil and moisture cause great variations in resistance to removal.

More recently, attempts have been made to utilize shorter rods and grooved rods by adding epoxy to the shorter holes drilled to compensate for the loss of friction from the deep drilled pins. These mid-length rods were typically 18 to 24 inches long. While reducing installation time, these systems continue to have some of the disadvantages known to deep hole pinning.

A primary disadvantage of the prior art mid-length anchors is that, as applied, they do not provide an improvement in safety of the anchoring system, including barrier displacement on impact, which is the essential purpose of the barrier anchoring system.

Another disadvantage of the prior art mid-length anchors is that it is difficult to accurately drill the holes vertically, resulting in variations in resistance to removal and thus inconsistent impact displacement results. Another disadvantage of the prior art mid-length anchors is that the inherent inconsistency in removal resistance requires a slightly deeper hole to be drilled to compensate for the variations.

Another disadvantage of the prior art mid-length anchors is that it remains ergonomically difficult to drill vertical holes proximate to the wall of the barriers. Another disadvantage of the prior art long and mid-length anchors is that when installed on a bridge deck, they penetrate the water sealed surface beneath the asphalt.

Thus, there remains a need for an anchoring system that overcomes these disadvantages and that provides an improved measure of safety by reducing deflections alongside excavations where workers are working.

A primary advantage of the various embodiments of the present invention is that they make installation of a barrier wall much easier, as it requires far less drilling and time to install. Another advantage of the disclosed embodiments is that it is unnecessary to engage rental equipment such as backhoes fitted with hydraulic hammers for the installation. Also, drilling at an angle to the barrier is easier than drilling vertically when the drill must be operated closer to the barrier.

Another advantage of the disclosed embodiments is that the epoxy around the anchor prevents creation of a subterranean path for water to get below the road surface and cause frost heaving when exposed to freezing temperatures.

Another advantage of the disclosed embodiments is that it eliminates the deep hole drilling that threatens subsurface utilities.

Another advantage of the disclosed embodiments is that it provides a controlled drilling angle for the pin which in turn provides a more predictable resistance to a more predictable resistance to movement of the barrier.

Another advantage of the disclosed embodiments is that upon impact, the angular disposition of the pin provides a greater resistance to retraction and displacement of the barriers on impact, and thus a greater measure of safety for workers operating on the opposite side of the barriers.

Another advantage of the disclosed embodiments is that upon impact, the insert behaves as a load transfer bushing between the barrier and the anchor to mitigate damage to the barrier. Another advantage of the disclosed embodiments is that it is easier to remove the pins when it is time to remove and relocate the barriers.

Another advantage of the disclosed embodiments is that it does not rely exclusively on the friction between the pin and the soil medium it engages for its resistance to removal. The epoxy penetrates permeable soil structure to produce a stronger and more consistent bond which reduces the variation in force required to remove the pin and thus increases the predictability of resistance to movement of the barrier.

Another advantage of the present invention is that it provides an opportunity for the use of short holes and pinning rods. Another advantage of the present invention is that it is compatible for use with existing barrier designs. Another advantage of the present invention is that when installed on a bridge deck, it does not penetrate the water sealed surface beneath the asphalt.

In summary, the disclosed invention provides a unique solution to the engineering constraints and challenges of providing an anchoring system for traffic barriers that is safe and economic to install and provides a greater resistance to displacement than known systems.

The advantages and features of the embodiments presently disclosed will become more readily understood from the following detailed description and appended claims when read in conjunction with the accompanying drawings in which like numerals represent like elements.

SUMMARY OF THE INVENTION

For all purposes of this disclosure, the following definitions are adopted. As used herein, the term "centerline" and "centerline 11" refers to a vertical plane that runs through the length of the barrier, and across which the barrier is symmetrical, such that the barrier is reversible and also usable between traffic traveling in opposite directions. The barrier vertical centerline provides a reference by which the relevant angles of other components may be indicated.

In one embodiment, a traffic barrier anchoring system is provided, having a traffic barrier comprising a top surface, a footer, and a wall extending inward and upward from the footer to the top surface. An anchor recess intersects the footer. In one embodiment, the anchor recess is rectilinear. A cylindrical footer port extends vertically through the footer beneath the anchor recess.

An insert is provided, comprising a head portion locatable in the anchor recess, and having a probe extending downward from the head portion that is locatable in the footer port. In one embodiment, the head portion is rectilinear for complimentary fit with a rectilinear anchor recess. An insert port extends through the head portion and the probe in angular relation to the footer port. A threaded rod extends through the insert port and the footer port to a predetermined subsurface depth of a road below the first traffic barrier. An adhesive adheres the threaded rod to the road. A threaded fastener connects to the threaded rod above the insert.

In another embodiment, the predetermined subsurface depth is eight inches or less. In another embodiment, the predetermined subsurface depth is between four and seven inches. In another embodiment, the predetermined subsurface depth is between three and four inches. In these new short-pinning embodiments, the pins are only between 9 and 14 inches long.

In another embodiment, the probe has a tapered cylindrical profile and is positioned in the footer port in interference fit.

In another embodiment, the probe further comprises a body portion that extends downward from the head portion in angular relation to the head portion, with the insert port centrally located in the body portion. A plurality of perimeter elements is located on a periphery of the body portion.

In another embodiment, the perimeter elements are ribs on the periphery of the body portion. In another embodiment, the ribs extend in horizontal rows angularly disposed to the body portion. In another embodiment, the ribs are located on the body portion in parallel relation to the head portion. In another embodiment, the ribs extend in vertical columns along the body portion.

In another embodiment, the ribs are located on the body portion in parallel relation to each other. In another embodiment, a slot extends between multiple rows, increasing flexibility during insertion and creating a path for extruded adhesive to flow without forcing the insert out of position.

In another embodiment, a peripheral diameter is defined by each row of ribs, with the peripheral diameter of at least one rib being greater than the diameter of the footer port. In another embodiment, the peripheral diameter of another rib is less than the diameter of the footer port to ease installation. In another embodiment, the ribs proximate to the head portion have a larger peripheral diameter than the ribs distal to the head portion.

In another embodiment, the insert port is concentric to the body portion. In another embodiment, the angle of the body portion to the head portion is between 6 and 11 degrees. In another embodiment, the angle of the body portion to the head portion is between 8 and 10 degrees. In another embodiment, the angle of the body portion to the head portion is 9 degrees. In another embodiment, the angle of the insert port to the footer port is 9 degrees.

In another embodiment, the head portion has a surface relief perpendicular to the body portion. In another embodiment, the head portion has an outer edge and an inner edge, and the inner edge is positioned closest to a centerline of the traffic barrier. In another embodiment, a direction indicator is located on the head portion.

In another embodiment, the adhesive is an epoxy. In another embodiment, the insert is made of a pliable material. In another embodiment, the insert is made of a ductile iron. In another embodiment, the insert is made of a high-density polyethylene. In another embodiment, insert 30 is comprised of a high-density polyethylene material having a modulus of elasticity of at least 0.9 MPa.

In another embodiment, the fastener has torque applied to place the threaded rod in tension and the footer in compression as against the road. Also disclosed is a method for anchoring a temporary barrier including the steps of:

1. providing a traffic barrier comprising: a footer; an anchor recess; and a cylindrical footer port extending vertically through the footer beneath the anchor recess;
2. providing an insert comprising a head portion and a probe extending downward from the head portion, and an insert port extending through the head portion and the probe in angular relation to the probe;
3. positioning the head portion of the insert in the anchor recess and the probe in the footer port such that the insert port is angled inward towards a centerline of the traffic barrier;
4. locating a drill bit within the insert port for proper alignment;
5. drilling a hole into the road to a predetermined depth;
6. depositing an adhesive into the drilled hole in the road;
7. inserting a threaded rod into the insert port and the drilled hole and the adhesive such that an exposed portion of the threaded rod extends above the insert;
8. allowing the adhesive to cure and to secure the threaded rod in the drilled hole;
9. attaching a threaded fastener to the exposed portion of the threaded rod; and,
10. torquing the threaded fastener to the desired amount to provide a compressive force to the footer of the traffic barrier.

DETAILED DESCRIPTION

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Figure 1:
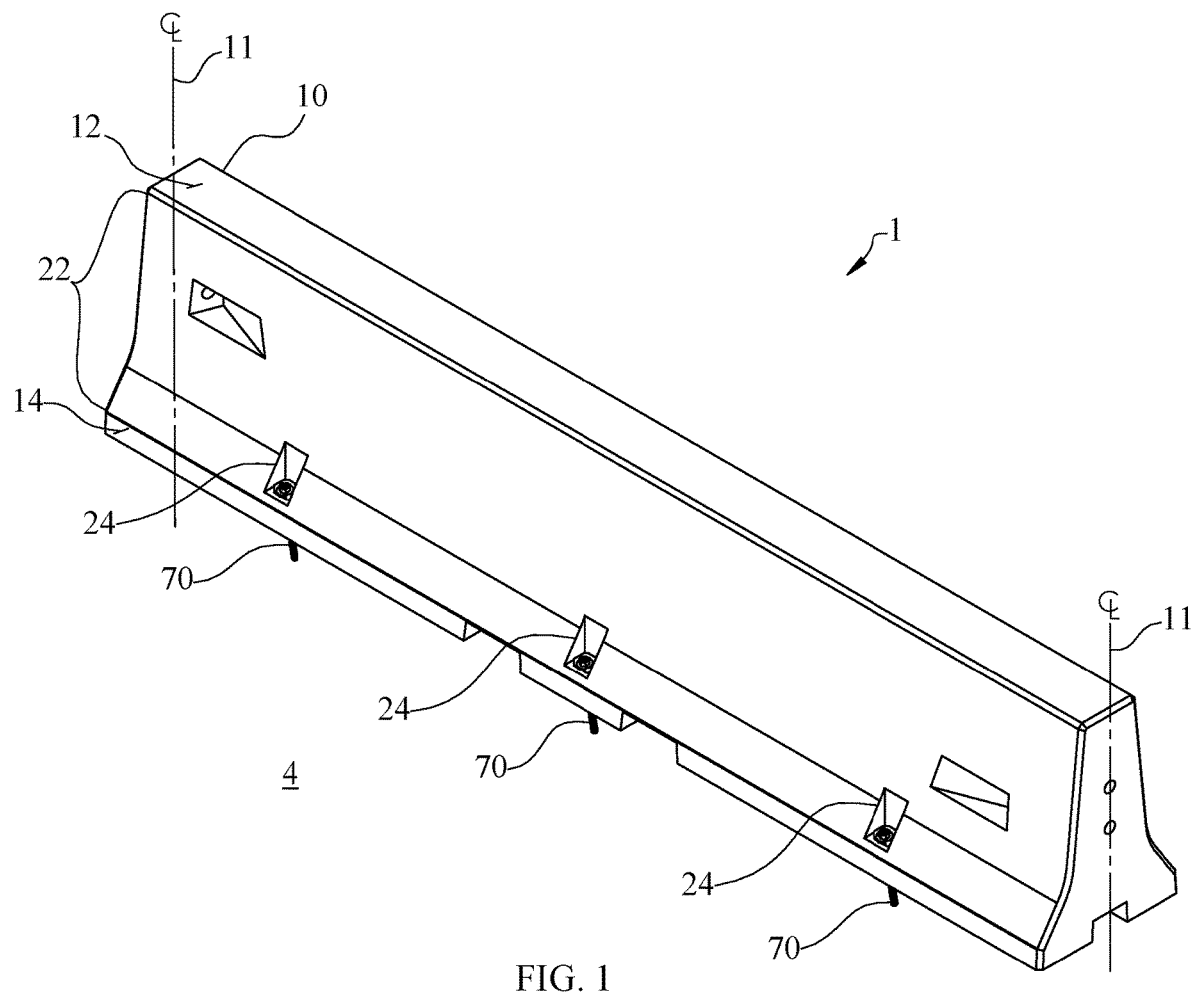
FIG. 1 is a perspective view of a barrier section, according to one embodiment of the present invention for an anchoring system for a traffic barrier.

FIG. 1 is a perspective view of a barrier section 10, according to one embodiment of the present invention for an anchoring system 1. As shown in FIG. 1, barrier 10 has a top surface 12 and a footer 14. A wall 22 extends inward and upward from footer 14 to top surface 12.

It is known that the profiles of mobile traffic barriers 10 vary considerably and such differences are known to have significant impact on the performance of barriers 10. However, such profile differences are not understood to be relevant to the performance benefits of the present invention and thus the above description is intended to cover all precast concrete traffic barriers.

Figure 5:
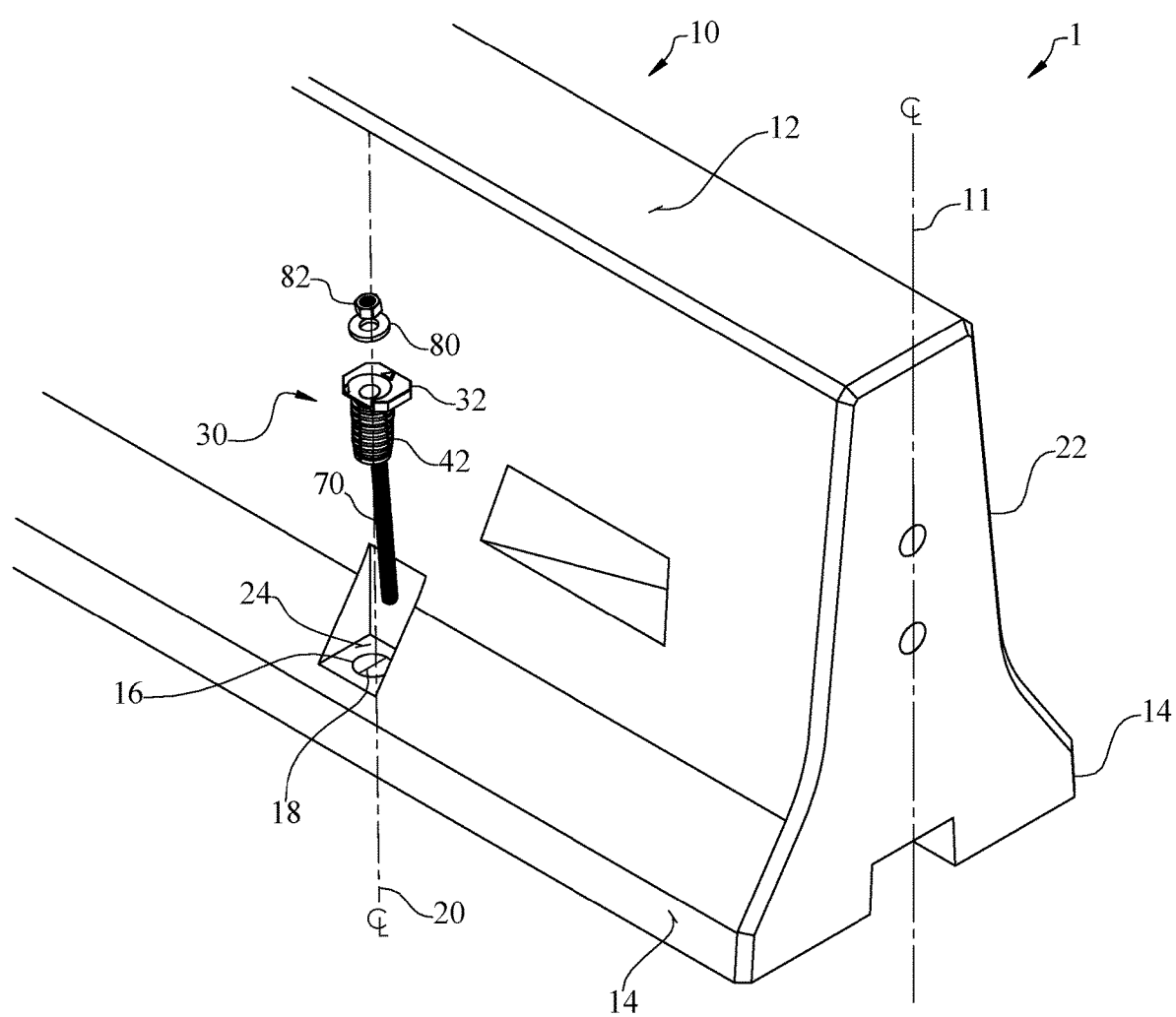
FIG. 5 is an isometric exploded view of one end of the embodiment of the barrier section illustrated in FIG. 1, illustrating the elements of the embodiment other than the adhesive.

A rectilinear anchor recess 24 intersects wall 22. As best seen in FIG. 5, a cylindrical footer port 16 extends vertically through footer 14 beneath anchor recess 24. As also seen in FIG. 5, footer port 16 has a port diameter 18.

Figure 2:
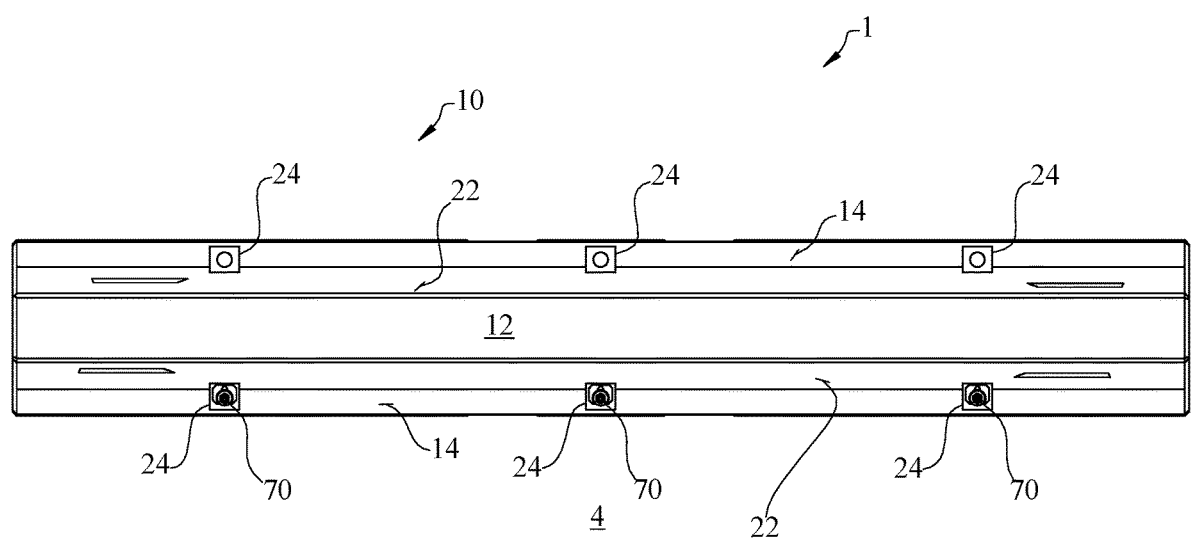
FIG. 2 is a top view of the embodiment of the barrier section illustrated in FIG. 1.

FIG. 2 is a top view of the embodiment of barrier 10 illustrated in FIG. 1. In this view, it is seen that barrier 10 may have a traffic side 4 by which traffic is passing and which side is inclined to collision. As seen is this view, and as also seen in FIG. 3, it is the traffic side 4 of barrier 10 in which threaded rods 70 are used to anchor barrier 10 to a road surface 2.

Figure 3:
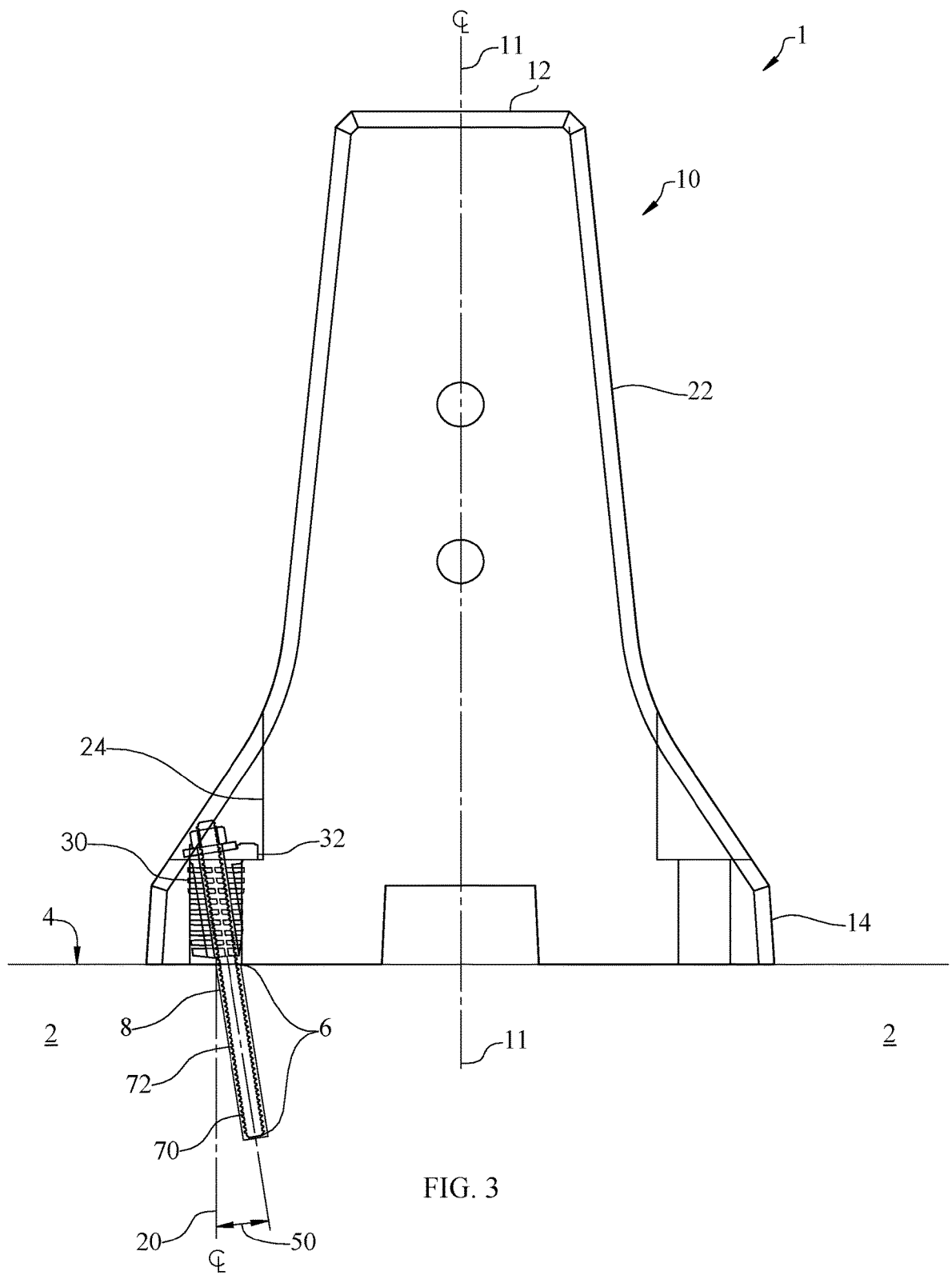
FIG. 3 is a cross-sectional end view of the embodiment of the barrier section illustrated in FIG. 1; sectioned at the anchor recess.

FIG. 3 is a cross-sectional end view of the embodiment of barrier 10 illustrated in FIG. 1, sectioned at anchor recess 24.

FIG. 3 further illustrates a conventional traffic barrier 10 having, generally, a top surface 12, a footer 14, and a wall 22 extending inward and upward from footer 14 to top surface 12. As shown in FIG. 3, wall 22 may include multiple components, including contiguous angular and curved portions.

As best seen in FIG. 3, barrier 10 may have a centerline 11 running vertically the length of barrier 10 across which barrier 10 is symmetrical. This allows barrier 10 to be reversible and also usable between traffic traveling in opposite directions.

In the present illustration, there is a traffic side 4 to barrier 10. It is on traffic side 4 that barrier 10 is anchored to road 2. Insert 30 is positioned with a probe 42 inside footer port 16, and head portion 32 of insert 30 against anchor recess 24 above footer port 16. An insert port 64 extends through head portion 32 and probe 42 in angular relation 50 to a centerline 20 of footer port 16 and inclined inward, towards barrier 10 centerline 11. A drill is inserted in insert port 64 to drill an anchor hole 8 in road 2 to a predetermined depth 6.

In one embodiment, the drilling of anchor hole 8 is accomplished with a hammer bit. This type of drilling significantly reduces the bit rotation speed and thus the heat generated at insert 30. As discussed further below, insert 30 may be made of a pliable material such as high-density polyethylene, and it is therefore desirable to limit the heat and shear forces imparted from the drill bit.

Insert port 64 is concentric to probe 42. Head portion 32 is perpendicular to footer port 16. In one embodiment, the angle of probe 42 to head portion 32 is between 8 and 10 degrees. In another embodiment, the angle of probe 42 to head portion 32 is approximately 9 degrees. As a result of the built-in angle of the insert port 64, anchor hole 8 is drilled at an angle of about 8 to 10 degrees from the vertical.

In one embodiment, anchor hole 8 is drilled to a predetermined depth 6 of eight inches or less. Upon removing the drill bit, an adhesive 72 is deposited into anchor hole 8, in an amount less than ⅓ of the volume of anchor hole 8. In another embodiment, anchor hole 8 is drilled to a predetermined depth 6 of between three and four inches.

A threaded rod 70 is placed in anchor hole 8 and adhesive 72 is allowed to cure, securing threaded rod 70 to road 2. A plate washer 80 (as shown in FIG. 5) may be placed on the portion of threaded rod 70 that remains exposed above head portion 32 of insert 30. A threaded fastener 82 is then threaded onto threaded rod 70. Fastener 82 is torqued to threaded rod 70 sufficient to provide a compressive force to footer 14.

As depicted in FIG. 3, the present invention allows for the use of a very short anchor hole 8, short threaded rod 70, and an accurately located and angled disposition of threaded rod 70 with respect to barrier 10. The advantage of this design is that upon impact between a vehicle and traffic side 4 of barrier 10, threaded rod 70 is subject to a larger shear stress cross-sectional area, and a bending stress as well. These factors significantly increase the resistance of barrier 10 to displacement, and of threaded rod 70 to shear failure, pull out from road 2, or tensile failure.

Figure 4:
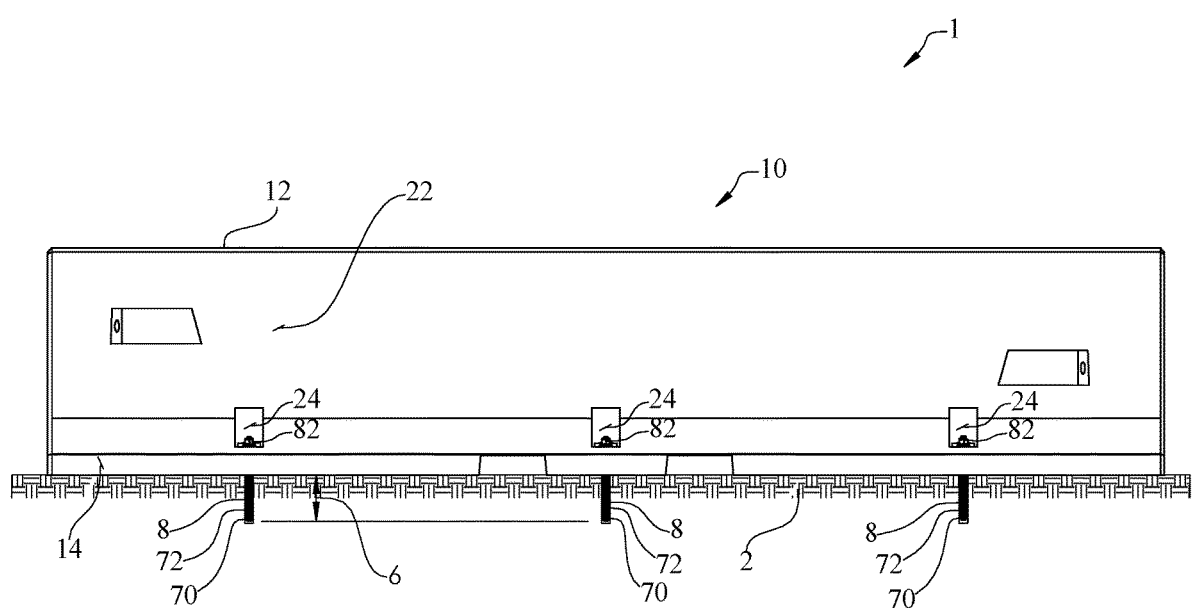
FIG. 4 is a side view of the embodiment of the barrier section illustrated in FIG. 1, illustrating the barrier anchored to the road.

FIG. 4 is a side view of the embodiment of the barrier 10 illustrated in FIG. 1, illustrating barrier 10 anchored to the traffic side 4 of road 2. As seen in this view, anchor holes 8 extend to a predetermined depth 6 below road 2. Adhesive 72 has been inserted into anchor holes 8 and expands upward with the insertion of threaded rods 70 to effectively adhere threaded rods 70 to road 2.

FIG. 5 is a sectional isometric exploded view of one end of the embodiment of barrier 10 illustrated in FIG. 1, illustrating the anchoring elements of the embodiment other than adhesive 72. FIG. 5 is useful in illustrating a method of anchoring a precast concrete barrier 10 in accordance with an embodiment of the present invention, that includes the following steps:

1. Providing a traffic barrier 10 which may comprise a footer 14, a top surface 12, a wall 22 extending inward and upward from footer 14 to top surface 12, and with barrier 10 further comprising a rectilinear anchor recess 24 and a cylindrical footer port 16 located in anchor recess 24 and extending vertically through footer 14;
2. Providing an insert 30 comprising a head portion 32 and a probe 42 extending downward from head portion 32, and having an insert port 64 extending through head portion 32 and probe 42 in angular relation 66 to a barrier centerline 11;
3. Positioning probe 42 in footer port 16 such that head portion 32 of insert 30 seats in anchor recess 24 so that insert port 64 is angled inward towards a centerline 11 of traffic barrier 10;
4. Locating a drill bit within insert port 64 for proper alignment of the drill bit;
5. Drilling a hole 8 into a road 2 to a predetermined depth 6 beneath barrier 10;
6. Depositing an adhesive 72 into drilled hole 8;
7. Inserting a threaded rod 70 into insert port 64 and drilled hole 8 and adhesive 72 such that an exposed portion of threaded rod 70 extends above insert 30;
8. Allowing adhesive 72 to cure and to secure threaded rod 70 in drilled hole 8;
9. Locating a plate washer 80 on threaded rod 70;
10. Attaching a threaded fastener 82 on threaded rod 70; and,
11. Torquing threaded fastener 82 to provide a compressive force between footer 14 and road 2.

Figure 6:
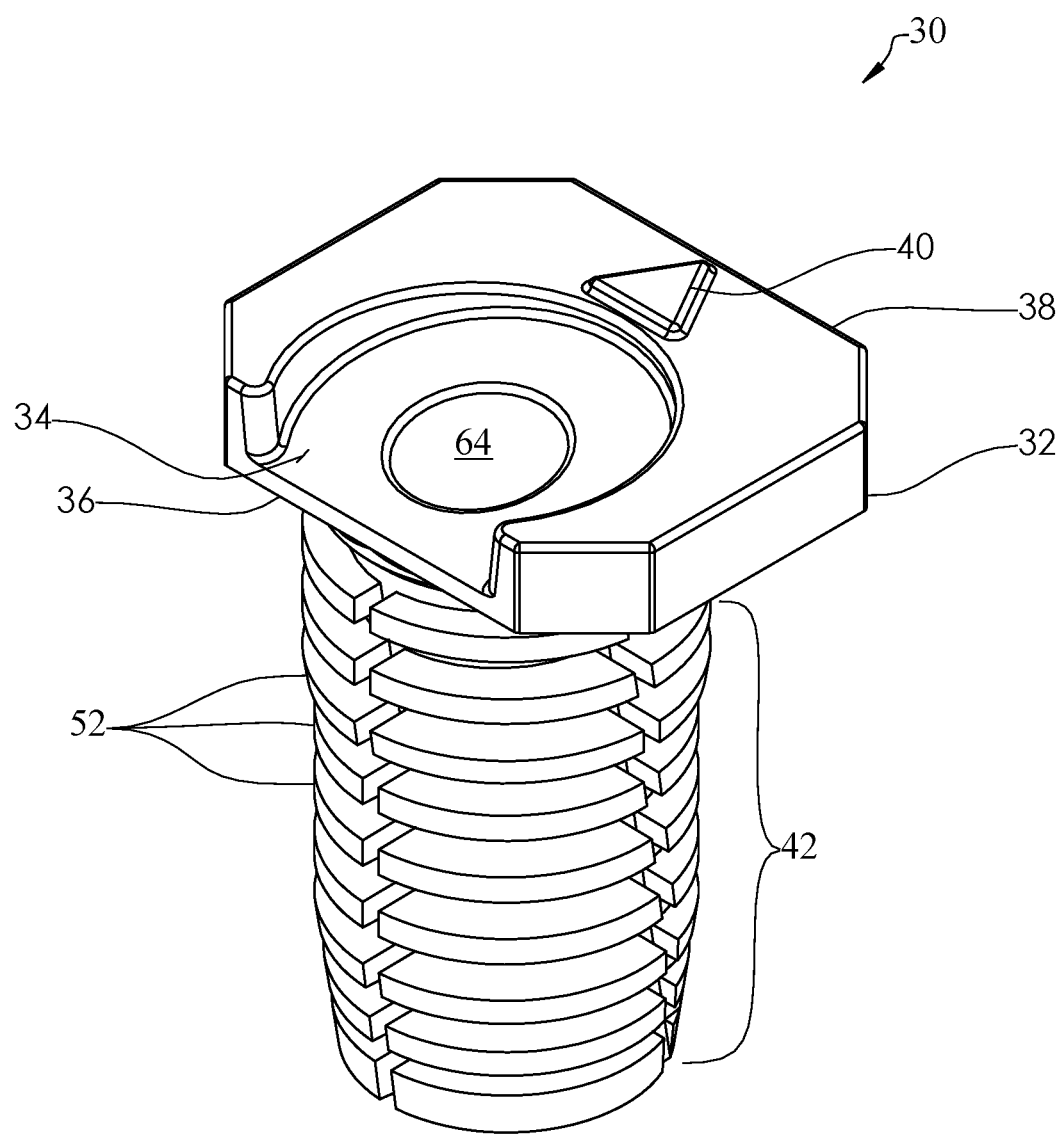
FIG. 6 is an isometric view of an embodiment of the insert of the present invention as would be compatible with the embodiment illustrated in FIG. 1.

FIG. 6 is an isometric view of an embodiment of insert 30 of the present invention as would be compatible with the embodiment illustrated in FIG. 1. Head portion 32 has an outer edge 36 and an inner edge 38. A direction indicator 40 may be provided to indicate the location of inner edge 38. A surface relief 34 is provided on head portion 32. Insert portal 64 extends through head portion 32. A plurality of perimeter elements 52 are located on probe 42. In the embodiment shown, perimeter elements 52 are in the form of ribs 52. A slot 62 may be provided extending between multiple rows, increasing flexibility of ribs 52 during insertion and creating a path for excess extruded adhesive 72 to flow and preventing displacement of insert 30 out of its seated position in anchor recess 24.

In one embodiment, insert 30 is made of a strong but pliable material, such as a high-density polyethylene. In another embodiment, insert 30 is comprised of a high-density polyethylene material having a modulus of elasticity of at least 9 MPa. Such material is commercially available, such as API II HDPE 20 Melt manufactured by API II located in Concord, Ohio.

One advantage to the use of insert 30 having the material properties identified is that insert 30 behaves as a load transfer bushing between barrier 10 and anchor 70. In this manner, it is desirable that insert 30 be pliable, and less brittle than barrier 10, which is normally precast concrete. By absorbing impact forces between barrier 10 and anchor 70 when barrier 10 is impacted, insert 30 mitigates damage to barrier 10. A relatively higher modulus of elasticity is associated with the ability of insert 30 to transfer barrier 10 collision impact forces in mitigation of damage to barrier 10.

Figure 7:
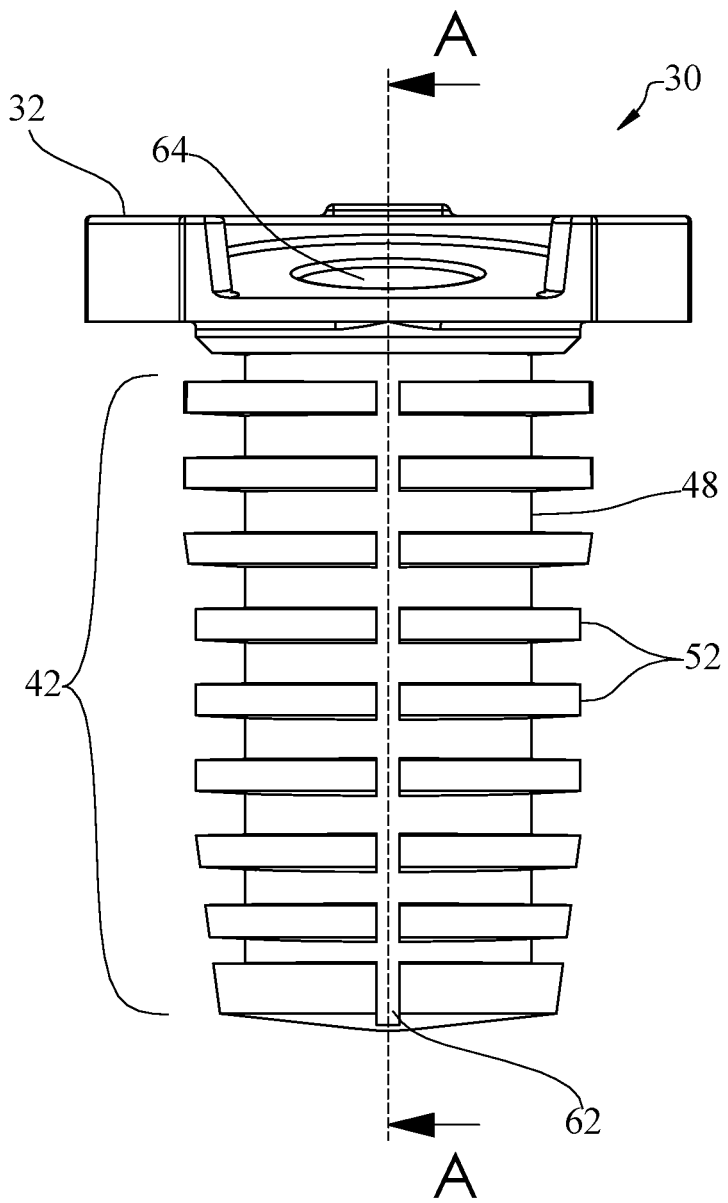
FIG. 7 is a front view of the embodiment of the insert illustrated in FIG. 6.

FIG. 7 is a front view of the embodiment of insert 30 illustrated in FIG. 6. As seen in the embodiment illustrated in FIG. 7, probe 42 has a tapered profile which permits easy and secure insertion into footer 16 port. Probe 42 may be larger proximate to head portion 32 and smaller at the section of probe 42 that is distal to head portion 32. As provided, probe 42 is inserted into footer port 16 in an initial clearance fit, transitioning to a slip fit, and finally achieving an interference fit with probe 42 when fully inserted such that head portion 32 rests on anchor recess 24.

Figure 8:
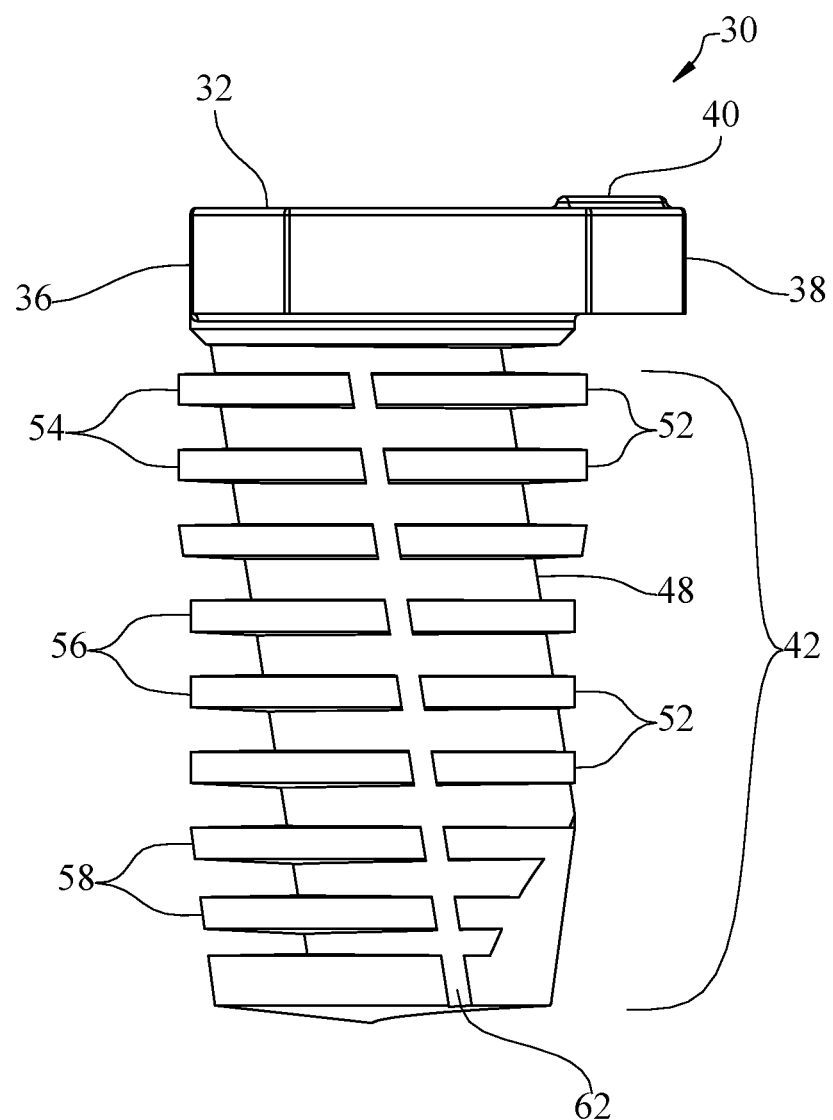
FIG. 8 is a side view of the embodiment of the insert illustrated in FIG. 6.

FIG. 8 is a side view of the embodiment of insert 30 illustrated in FIGS. 6 and 7. As seen in FIG. 8, probe 42 has a body portion 48 disposed at an angle relative to head portion 32 of insert 30. In the embodiment illustrated, ribs 52 are positioned in horizontal relationship to body portion 48.

Figure 9:
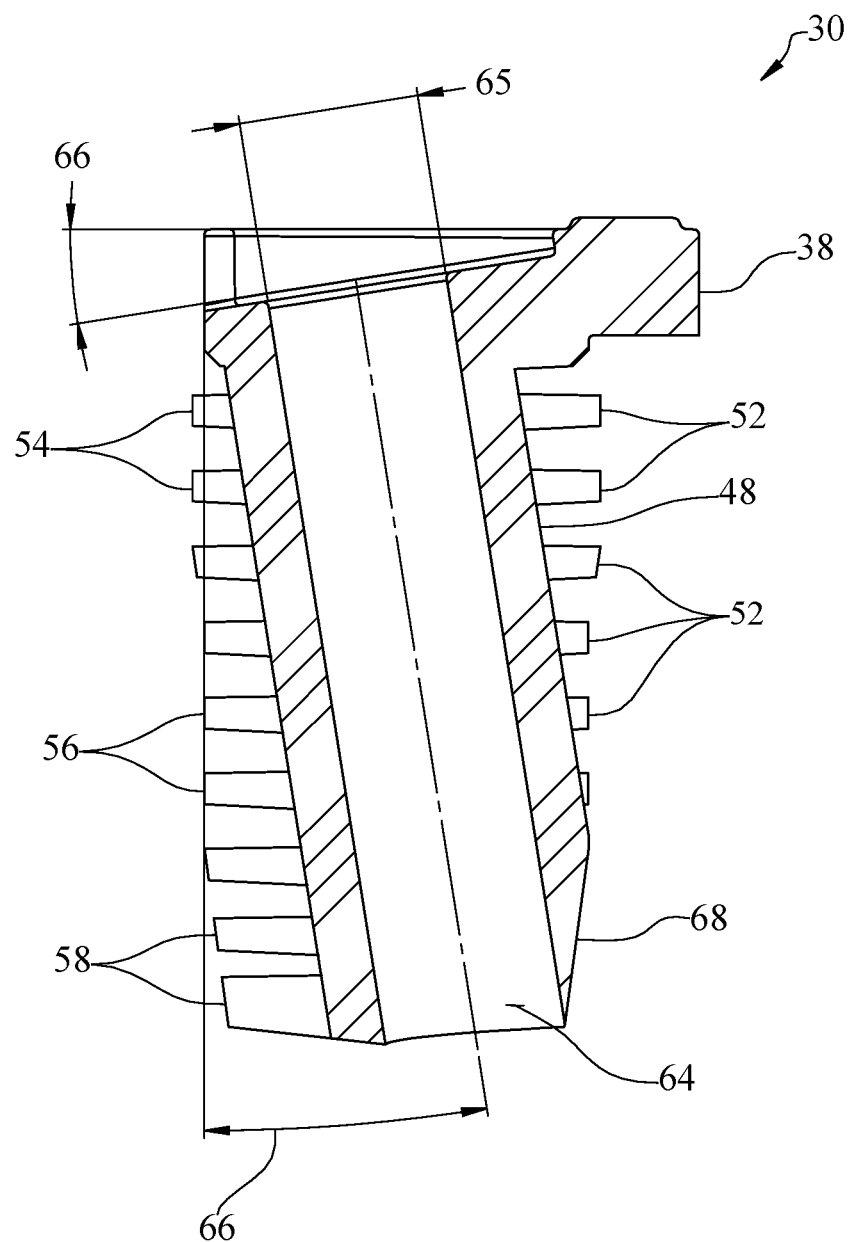
FIG. 9 is a half-section side view of the embodiment of the insert illustrated in FIG. 6.

FIG. 9 is a half-section side view of the embodiment of insert 30 illustrated in FIGS. 6 through 8. As best seen in FIG. 9, insert port 64 extends concentrically through body portion 42. Body portion 42 and insert port 64 are projected at an angle 66 to a vertical centerline of head portion 32 and thus at an angle 66 to footer port 16. More relevantly, insert port 64 is projected at an angle 66 to centerline 11 of barrier 10 when installed. This will allow insert port 64 to be used as a guide to align a drill bit to drill to a predetermined depth 6 into road 2 at predetermined angle 66.

In one embodiment, angle 66 is between 6 and 11 degrees. In another embodiment, angle 66 is between 8 and 10 degrees. In another embodiment, as shown, angle 66 is 9 degrees.

As also described in the description for FIG. 7, and optional to this embodiment, ribs 52 have different profile diameters to provide tapered cylindrical profile to probe 42. In the embodiment illustrated, large ribs 54 have a profile diameter greater than footer port 16. Medium ribs 56 have a profile diameter approximately equal to footer port 16. Small ribs 58 have a profile diameter less than footer port 16. As illustrated, small ribs 58 are in clearance fit relationship with footer port 16. Medium ribs 56 are in slip fit relationship with footer port 16. Large ribs 54 are in interference fit with footer port 16 to help secure insert 30 in footer port 16.

Figure 10:
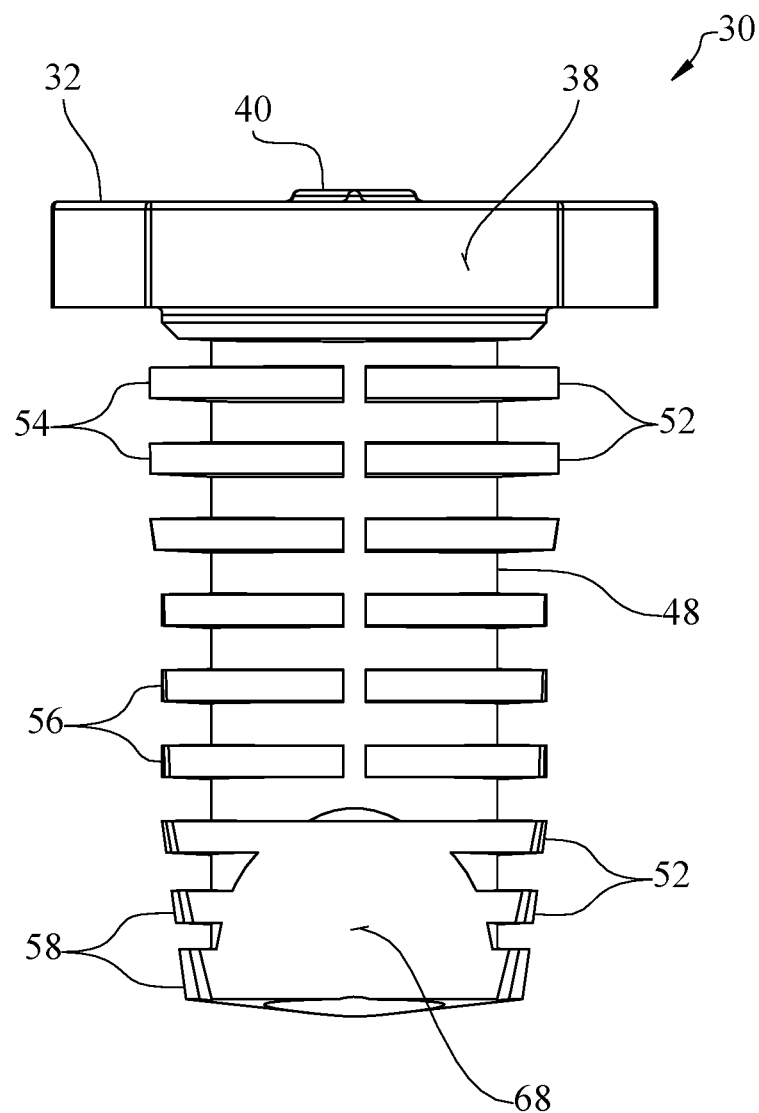
FIG. 10 is a rear view of the embodiment of the insert illustrated in FIG. 6.

FIG. 10 is a rear view of the embodiment of the insert 30 illustrated in FIG. 6. As seen in this view, insert 30 has a beveled end 68 to permit insertion of insert 30 into footer port 16 while accommodating the entire bore length of insert port 64. This permits the desired angle of drilling through insert port 64 without drilling into barrier 10 before reaching road 2 with the drill. As seen in FIG. 10, beveled end 68 is aligned with inner edge 38 of head portion 32 of insert 30. This alignment insures that drilled hole 8 will be properly inclined toward centerline 11 and beneath barrier 10.

Figure 11:
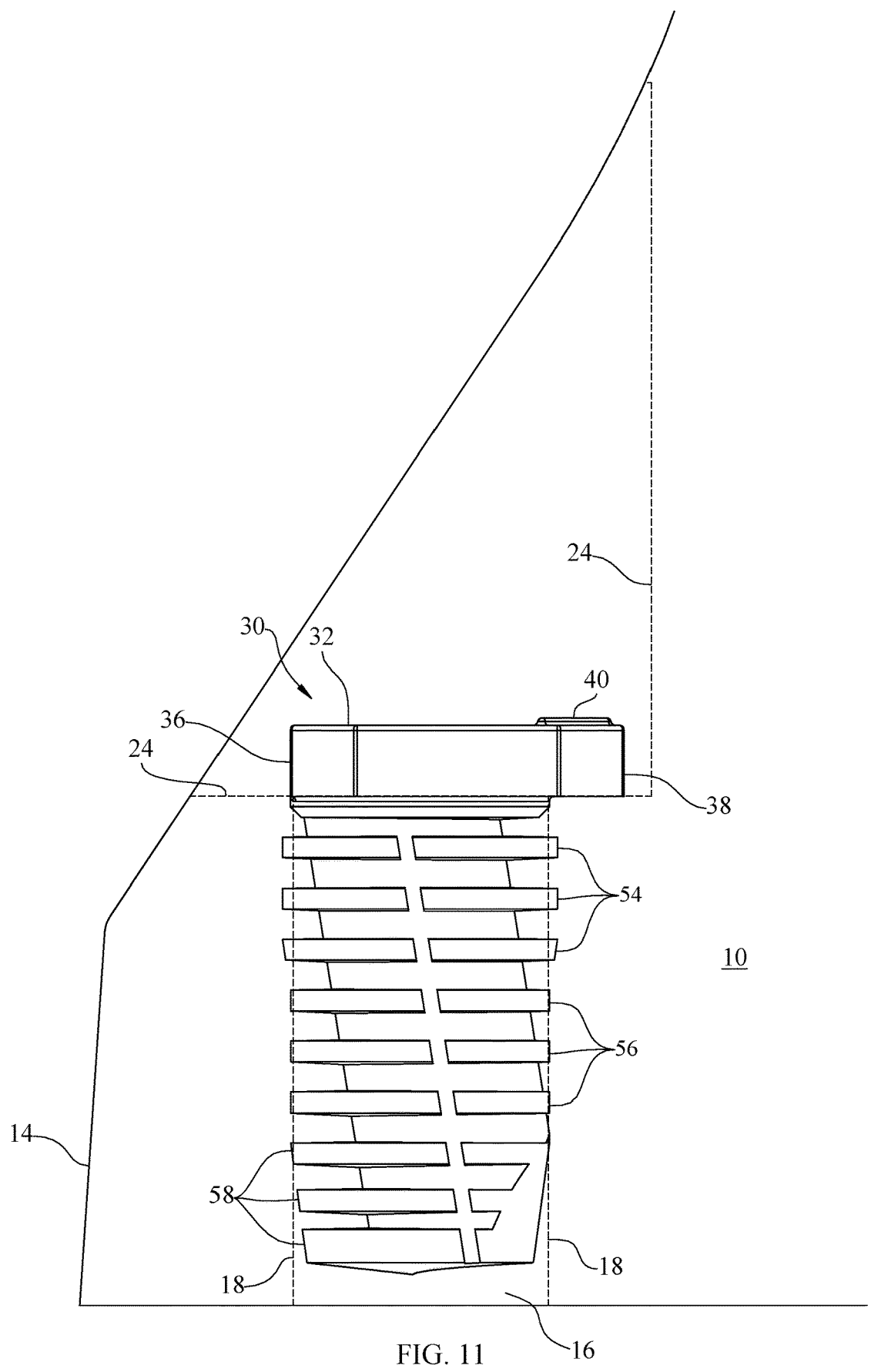
FIG. 11 is a side sectional view of the embodiment of the insert illustrated in FIG. 6, illustrating the insert located in the footer port of the barrier.

FIG. 11 is a side sectional view of the embodiment of insert 30 illustrated in FIG. 6, illustrating insert 30 located in footer port 16 of barrier 10. Large diameter ribs 54 are shown uncompressed for comparison to port diameter 18. As seen in this view, large diameter ribs 54 are larger in diameter than port diameter 18 of footer port 16, such that large diameter ribs 54 would be compressed in interference fit on insertion of insert 30 into footer port 16.

As also seen in this view, medium diameter ribs 56 are equal in diameter to port diameter 18 of footer port 16, such that medium diameter ribs 56 would be located in a slip fit of slight compression fit on insertion of insert 30 into footer port 16.

Finally, as also seen in this view, small diameter ribs 58 are smaller in diameter than port diameter 18 of footer port 16, such that small diameter ribs 58 would be located in a clearance fit relationship on insertion of insert 30 into footer port 16. This particular embodiment is provided to ease insertion of inserts 30 into footer ports 16 while maintaining the orientation of insert 30 to barrier 10 to initiate the proper drilling angle. Once drilling is initiated, the relationship between insert head 32 resting in anchor recess 24 and the unique angular relationship between insert body 48 and insert port 64 will resist rotation as the drill is rotated and forced downward.

Figure 12:
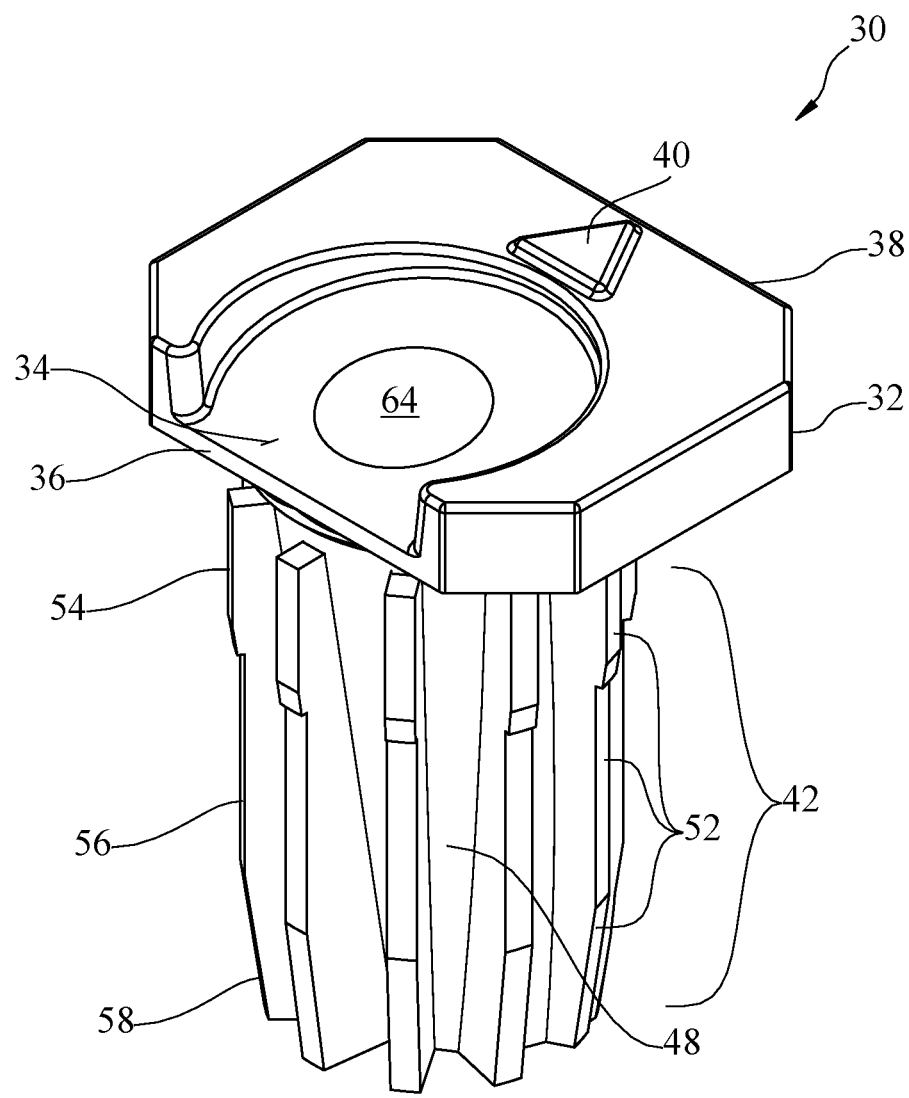
FIG. 12 is an isometric view of an alternative embodiment in which the insert has vertically arranged ribs.

FIG. 12 is an isometric view of an alternative embodiment of insert 30. In the embodiment illustrated in FIG. 12, insert 30 has vertically arranged ribs 52 extending from body portion 48 of probe 42. Optional to this embodiment, ribs 52 include a large diameter rib portion 54, a medium diameter rib portion 56, and a small diameter rib portion 58. The increasingly large ribs 52 provide tapered cylindrical profile to probe 42. In the embodiment illustrated, large ribs 54 have a profile diameter greater than footer port 16. Medium ribs 56 have a profile diameter approximately equal to footer port 16. Small ribs 58 have a profile diameter less than footer port 16. As illustrated, small ribs 58 are in clearance fit relationship with footer port 16. Medium ribs 56 are in slip fit relationship with footer port 16. Large ribs 54 are in interference fit with footer port 16 to help secure insert 30 in footer port 16.

Figure 13:
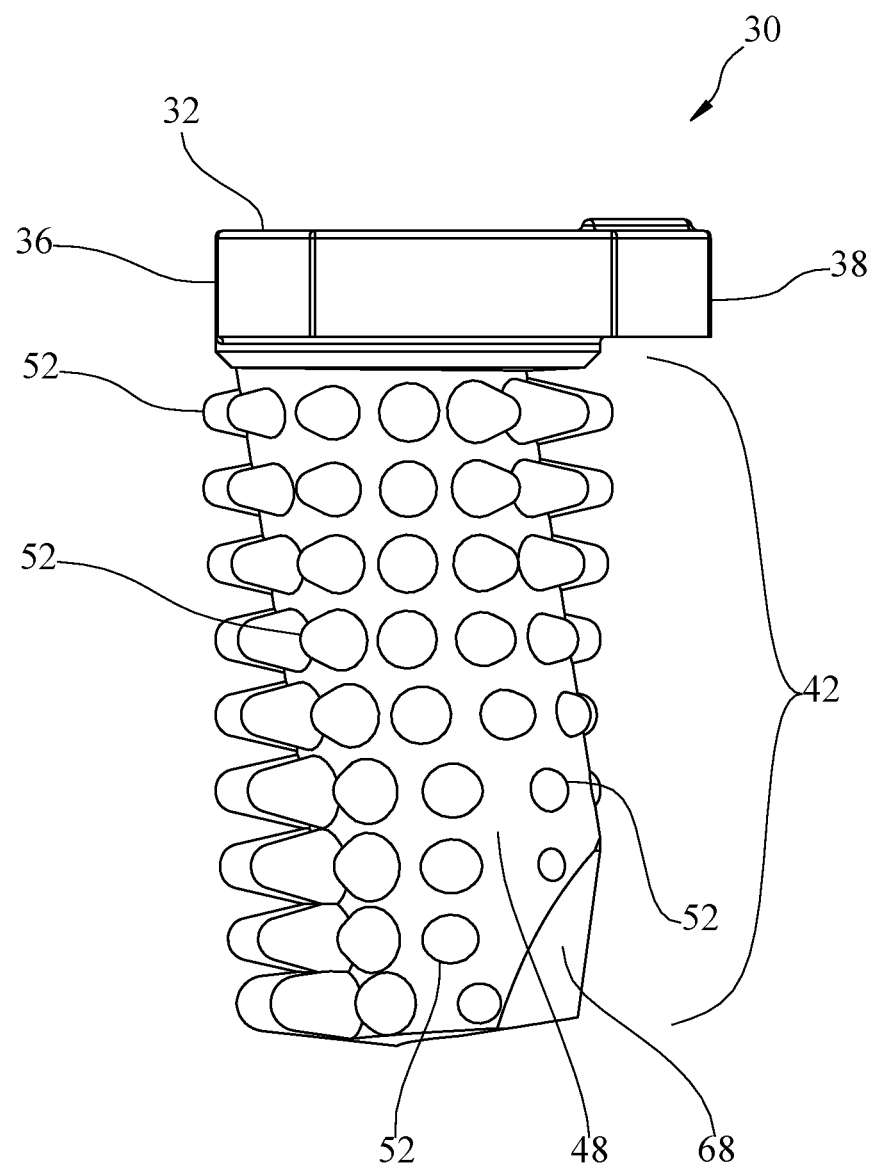
FIG. 13 is a side view of an alternative embodiment of insert 30 in which the insert has a plurality of perimeter elements in the form of semi-spherical protrusions.

FIG. 13 is a side view of an alternative embodiment of insert 30. In the embodiment illustrated in FIG. 13, insert 30 has a plurality of perimeter elements 52 extending from body portion 48 of probe 42. In this embodiment, perimeter elements 52 are in the form of semi-spherical protrusions 52. As with the other embodiments, body 48 of probe 42 is non-orthogonally oriented as to head 32 of insert 30. As a result, perimeter elements 52 are provided in a combination of sizes to provide a generally cylindrical profile for insertion of probe 42 into footer port diameter 18 of footer port 16, when footer port 16 is orthogonally oriented to head 32 of insert 30. Optional to this embodiment, perimeter elements 52 may be of such extension from body portion 48 and at such location on body portion 48 so as to provide probe 42 with a tapered profile for easy insertion into footer port 16. Optional to this embodiment, perimeter elements 52 may be of such extension from body portion 48 and at such location on body portion 48 so as to provide probe 42 with a tapered profile for achieving an interference fit relationship with footer port 16 when fully inserted into footer hole 16.

Ribs 52 include a large diameter rib portion 54, a medium diameter rib portion 56, and a small diameter rib portion 58. The increasingly large ribs 52 provide tapered cylindrical profile to probe 42. In the embodiment illustrated, large ribs 54 have a profile diameter greater than footer port 16. Medium ribs 56 have a profile diameter approximately equal to footer port 16. Small ribs 58 have a profile diameter less than footer port 16. As illustrated, small ribs 58 are in clearance fit relationship with footer port 16. Medium ribs 56 are in slip fit relationship with footer port 16. Large ribs 54 are in interference fit with footer port 16 to help secure insert 30 in footer port 16.

As used herein, the term "substantially" is intended for construction as meaning "more so than not". As used herein, the term "centerline" and "centerline 11" refers to a vertical plane that runs through the length of barrier 10, and across which barrier 10 is symmetrical. This allows barrier 10 to be reversible and also usable between traffic traveling in opposite directions.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and, in a manner, consistent with the scope of the invention.

The invention claimed is:

1. A traffic barrier anchoring system, comprising:
 a traffic barrier comprising:
 a footer;
 a rectilinear anchor recess intersecting the footer;
 a cylindrical footer port extending through the footer beneath the rectilinear anchor recess and defining a vertical centerline axis substantially perpendicular to a road surface below the traffic barrier;
 an insert comprising:
 a rectilinear head portion positioned in the rectilinear anchor recess;
 a probe having a cylindrical body portion extending downward from the rectilinear head portion and defining a centerline axis in angular relation to a vertical centerline of the rectilinear head portion and positioned in the cylindrical footer port;
 a plurality of ribs disposed on a periphery of the cylindrical body portion and configured to matingly engage an inner cylindrical wall of the cylindrical footer port; and
 an insert port extending through the rectilinear head portion and the probe and defining a centerline axis in angular relation to the vertical centerline axis of the cylindrical footer port;
 wherein the rectilinear head portion is configured to engage the rectilinear anchor recess in close relation to prevent rotation of the insert and maintain the angular relationship between the insert port and the cylindrical footer port;
 a threaded rod extending through the insert port and the cylindrical footer port to a predetermined subsurface depth of a road below the traffic barrier;
 an adhesive adhering the threaded rod to the road; and
 a threaded fastener connected to the threaded rod above the insert.

2. The traffic barrier anchoring system of claim 1, further comprising:
 the predetermined subsurface depth being eight inches or less.

3. The traffic barrier anchoring system of claim 1, further comprising:
 the predetermined subsurface depth being between three and four inches.

4. The traffic barrier anchoring system of claim 1, further comprising:
 the predetermined subsurface depth being less than a depth to a water seal beneath a surface of the road on a bridge.

5. The traffic barrier anchoring system of claim 1, further comprising:
 the head portion fitting into the anchor recess in close relation so as to align an inner edge of the head portion proximate a centerline of the barrier.

6. The traffic barrier anchoring system of claim 1, further comprising:
the probe having a tapered profile; and
the probe positioned in the footer port in interference fit.

7. The traffic barrier anchoring system of claim 1, the probe further comprising:
the insert port being centrally located in the body portion.

8. The traffic barrier anchoring system of claim 7, further comprising:
the ribs extending in horizontal rows angularly disposed to the body portion.

9. The traffic barrier anchoring system of claim 8, further comprising:
a slot extending between multiple rows.

10. The traffic barrier anchoring system of claim 7, further comprising:
the ribs positioned on the body portion in parallel relation to the head portion.

11. The traffic barrier anchoring system of claim 7, further comprising:
the ribs are positioned on the body portion in parallel relation to each other.

12. The traffic barrier anchoring system of claim 7, further comprising:
an angle of the body portion to the head portion being between 6 and 11 degrees.

13. The traffic barrier anchoring system of claim 7, further comprising:
an angle of the body portion to the head portion being between 8 and 10 degrees.

14. The traffic barrier anchoring system of claim 7, further comprising:
an angle of the body portion to the head portion being 9 degrees.

15. The traffic barrier anchoring system of claim 7, further comprising:
the insert port being concentric to the body portion.

16. The traffic barrier anchoring system of claim 7, further comprising:
the head portion having a surface relief perpendicular to the body portion for receiving the threaded fastener.

17. The traffic barrier anchoring system of claim 1, further comprising:
a peripheral diameter defined by rows of ribs on the body portion extending downward from the head portion in angular relation to the head portion;
the peripheral diameter of a rib being greater than the diameter of the footer port; and
the peripheral diameter of another rib being less than the diameter of the footer port.

18. The traffic barrier anchoring system of claim 17, further comprising:
the ribs proximate to the head portion having a larger peripheral diameter than the ribs distal to the head portion.

19. The traffic barrier anchoring system of claim 1, further comprising:
the angle of the insert port to the footer port being 9 degrees.

20. The traffic barrier anchoring system of claim 1, further comprising:
the head portion having an outer edge and an inner edge; and
wherein the inner edge is positioned closest to a centerline of the traffic barrier.

21. The traffic barrier anchoring system of claim 1, further comprising:
a direction indicator located on the head portion.

22. The traffic barrier anchoring system of claim 1, further comprising:
the adhesive being an epoxy.

23. The traffic barrier anchoring system of claim 1, further comprising:
the insert being made of a pliable material.

24. The traffic barrier anchoring system of claim 1, further comprising:
the insert being made of a high-density polyethylene.

25. The traffic barrier anchoring system of claim 1, further comprising:
the fastener having torque applied to place the threaded rod in tension and the footer in compression against the road.

26. A method of anchoring a traffic barrier to a road, comprising:
providing a traffic barrier comprising:
a footer;
a rectilinear anchor recess intersecting the footer; and
a cylindrical footer port extending through the footer beneath the rectilinear anchor recess and defining a vertical centerline axis substantially perpendicular to a road surface below the traffic barrier;
providing an insert comprising:
a rectilinear head portion;
a probe having a cylindrical body portion extending downward from the rectilinear head portion and defining a centerline axis in angular relation to a vertical centerline of the rectilinear head portion;
a plurality of ribs disposed on a periphery of the cylindrical body portion and configured to matingly engage an inner cylindrical wall of the cylindrical footer port; and
an insert port extending through the rectilinear head portion and the probe and defining a centerline axis in angular relation to the vertical centerline axis of the cylindrical footer port;
positioning the probe of the insert in the cylindrical footer port and the rectilinear head portion of the insert in the rectilinear anchor recess so that the insert port is angled inward towards a centerline of the traffic barrier at a predetermined angle, wherein the rectilinear head portion is configured to engage the rectilinear anchor recess in close relation to prevent rotation of the insert and maintain the angular relationship between the insert port and the cylindrical footer port;
locating a drill bit within the insert port for proper alignment;
drilling a hole into the road to a predetermined depth at the predetermined angle; depositing an adhesive into the drilled hole in the road;
inserting a threaded rod into the insert port and the drilled hole and the adhesive such that an exposed portion of the threaded rod extends above the insert;
allowing the adhesive to cure and to secure the threaded rod in the drilled hole;
attaching a threaded fastener to the exposed portion of the threaded rod; and
torquing the threaded fastener to a desired amount to provide a compressive force to the footer of the traffic barrier.

* * * * *